United States Patent
Jarvis et al.

(10) Patent No.: US 7,024,530 B2
(45) Date of Patent: Apr. 4, 2006

(54) METHOD, SYSTEM, AND PROGRAM FOR ESTABLISHING AND USING A POINT-IN-TIME COPY RELATIONSHIP

(75) Inventors: Thomas Charles Jarvis, Tucson, AZ (US); Karl Allen Nielsen, Tucson, AZ (US); Gail Andrea Spear, Tucson, AZ (US); Sam Clark Werner, Tucson, AZ (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 10/388,568

(22) Filed: Mar. 14, 2003

(65) Prior Publication Data

US 2004/0181639 A1   Sep. 16, 2004

(51) Int. Cl.
*G06F 12/00* (2006.01)
(52) U.S. Cl. .................. 711/162; 711/161; 707/203
(58) Field of Classification Search ........ 711/111–114, 711/141, 145, 161–162, 165; 707/202–205; 714/1–7
See application file for complete search history.

(56) References Cited

U.S. PATENT DOCUMENTS

| | | | | |
|---|---|---|---|---|
| 5,403,639 | A | 4/1995 | Belsan et al. ............... | 707/204 |
| 5,410,667 | A | 4/1995 | Belsan et al. ............... | 711/114 |
| 5,546,579 | A | 8/1996 | Josten et al. ................ | 707/8 |
| 5,634,110 | A | 5/1997 | Laudon et al. .............. | 711/145 |
| 6,038,639 | A | 3/2000 | O'Brien et al. ............. | 711/114 |
| 6,055,603 | A | 4/2000 | Ofer et al. .................. | 711/113 |
| 6,088,697 | A * | 7/2000 | Crockett et al. ............. | 707/10 |
| 6,094,709 | A | 7/2000 | Baylor et al. ............... | 711/141 |
| 6,209,070 | B1 | 3/2001 | Reed et al. ................. | 711/165 |
| 6,338,114 | B1 | 1/2002 | Paulsen et al. ............. | 711/112 |
| 6,611,848 | B1 * | 8/2003 | Bradley ....................... | 707/201 |
| 6,643,671 | B1 * | 11/2003 | Milillo et al. ............... | 707/204 |
| 2003/0158869 | A1 * | 8/2003 | Micka ........................ | 707/203 |

OTHER PUBLICATIONS

Blaney, Pat. "ESS Copy Services for Open Systems", *IBM Storage Solutions*. © IBM Corporation 2002. pp. 1-42.

(Continued)

*Primary Examiner*—Nasser Moazzami
(74) *Attorney, Agent, or Firm*—David W. Victor; Konrad Raynes & Victor LLP

(57) ABSTRACT

Provided are a method, system, and program for establishing a point-in-time copy. A source relationship data structure and target relationship data structure are generated when establishing a point-in-time copy relationship between source and target storage areas, wherein the source and target relationship data structures each include an indicator for each source storage area and corresponding target storage area in the point-in-time copy relationship. The source and target relationship data structures are initialized to set the indicator for each source storage area and corresponding target storage area in the point-in-time copy relationship to a first value. A determination is made that data was written to one target storage area after establishing the point-in-time copy relationship. The indicators in the source and target relationship data structures corresponding to the source storage area and corresponding target storage area to which data was written are set to a second value.

33 Claims, 7 Drawing Sheets

OTHER PUBLICATIONS

Mellish, Barry, Vladimir Blazek, Andrew Beyer, and Rainer Wolafka. "Implementing ESS Copy Services on UNIX and Windows NT/2000", *IBM Redbooks*, 1st Edition, Feb. 2001. pp. 1-217.

Nomani, Aslam, Cialini Enzo, Brigitte Blaser, and David Davis. "Using IBM TotalStorage Enterprise Storage Server (ESS) with IBM DB2 UDB Enterprise Edition v 7.2 and SAP R/3", © IBM Corporation 2002. pp. 1-33.

U.S. Appl. No. 09/459,159, filed Dec. 10, 1999, entitled "Methods and Apparatus for Use in Allowing Open System Hosts to Initiate Quick Copy", invented by D. Dewey, K. F. Day III, & Cindy L. Grossman.

U.S. Appl. No. 09/745,329, filed Dec. 20, 2000, entitled "DASD- Free Non-Volitile Updates", invented by Y. Novick, S. Tal, E. Webman, and Y. Petruschka.

U.S. Appl. No. 10/015,088, filed Dec. 12, 2001, entitled "A Data Storage System and a Method of Storing Data Including a Multi-Level Cache", invented by H. Butterworth & R. B. Nicholson.

U.S. Appl. No. 10/114,677, filed Apr. 3, 2002, entitled "Fast Data Copy Using a Data Copy Track Table", invented by D. G. Beal.

\* cited by examiner

METHOD, SYSTEM, AND PROGRAM FOR ESTABLISHING AND USING A POINT-IN-TIME COPY RELATIONSHIP

BACKGROUND OF THE INVENTION

1. Field of the Invention

The present invention relates to a method, system, and program for establishing and using a point-in-time copy relationship.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, such as a Direct Access Storage Device (DASD), Redundant Array of Independent Disks (RAID), Just a Bunch of Disks (JBOD), etc. Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time relationship between source and target volumes. A bitmap is maintained for each volume having a bit value for each track indicating whether the data for a track is located in the volume or another volume. During the establishment operation, all the bit values in the bitmap for the target volume are set to "on" to indicate that the data for the target volume is at another location. After the relationship is established, if an attempt is made to stage data to a track, the bit value in the bitmap for the volume including the track is checked. If the bit value is "on", indicating the track is a target track subject to a point-in-time copy relationship, then the target track is staged from the corresponding source track in the source device into the target cache. If an access attempts to destage a source track from source cache, the bitmap for the corresponding target volume having the target track is checked. If the bit value in the target bitmap is "one", then the target track is staged from the source device to the target cache, then destaged from the target cache to the target device and the bit value in the target bitmap for the destaged track from target cache is set to "off". The access to the source track is only granted after the target relationship bitmap indicates that there is no longer any need to stage the source track to the target cache.

Prior art operations to tracks subject to a point-in-time copy relationship, such as a FlashCopy relationship, require that the target bitmap be readable to both the source and target volumes so that stages and destages can be coordinated to maintain the point-in-time copy relationship. To allow the target bitmap to be readable to both the source and target volumes, in the prior art, the source and target volumes involved in a point-in-time copy relationship must be in the same cluster and logical subsystem. A cluster comprises a separate processor complex, cache, and power boundary, so that if one cluster in a system fails, as part of a failover, the surviving cluster can handle I/O requests. A logical subsystem (LSS) is a logical structure used for configuration of the device. A logical subsystem comprises logical functions of a storage controller that allow one or more host I/O interfaces to access a set of devices. One or more logical subsystems may exist on a storage controller and a given set of devices is typically associated with only one logical subsystem.

There is a need in the art to provide improved techniques for implementing and using a point-in-time copy relationship.

SUMMARY OF THE DESCRIBED IMPLEMENTATIONS

Provided are a method, system, and program for establishing a point-in-time copy. A source relationship data structure and target relationship data structure are generated when establishing a point-in-time copy relationship between source and target storage areas, wherein the source and target relationship data structures each include an indicator for each source storage area and corresponding target storage area in the point-in-time copy relationship. The source and target relationship data structures are initialized to set the indicator for each source storage area and corresponding target storage area in the point-in-time copy relationship to a first value. A determination is made that data was written to one target storage area after establishing the point-in-time copy relationship. The indicators in the source and target relationship data structures corresponding to the source storage area and corresponding target storage area to which data was written are set to a second value.

In further implementations, a request to update one source storage area included in the point-in-time copy relationship is received. If the indicator in the source relationship data structure for the source storage area to update is the second value, then the update to the source storage area is applied.

In still further implementations, if the indicator in the source relationship data structure for the source storage area to update is the first value, then a determination is made as to whether the indicator in the target relationship data structure for the target storage area corresponding to the source storage area to update is set to the first value. If the determined indicator in the target relationship data structure is the first value, then the data in the source storage area to update is written to the target storage area. The update is applied to the source storage area after writing the data in the source storage area to the target storage area if the determined indicator in the target relationship data structure is the first value.

Yet further, the storage areas may comprise tracks, and determining whether data was written to one target storage area comprises determining whether the target track in a target cache was destaged to the target track. Further, the indicators in the source and target relationship data structures are set to the second value after destaging the target track from the target cache.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
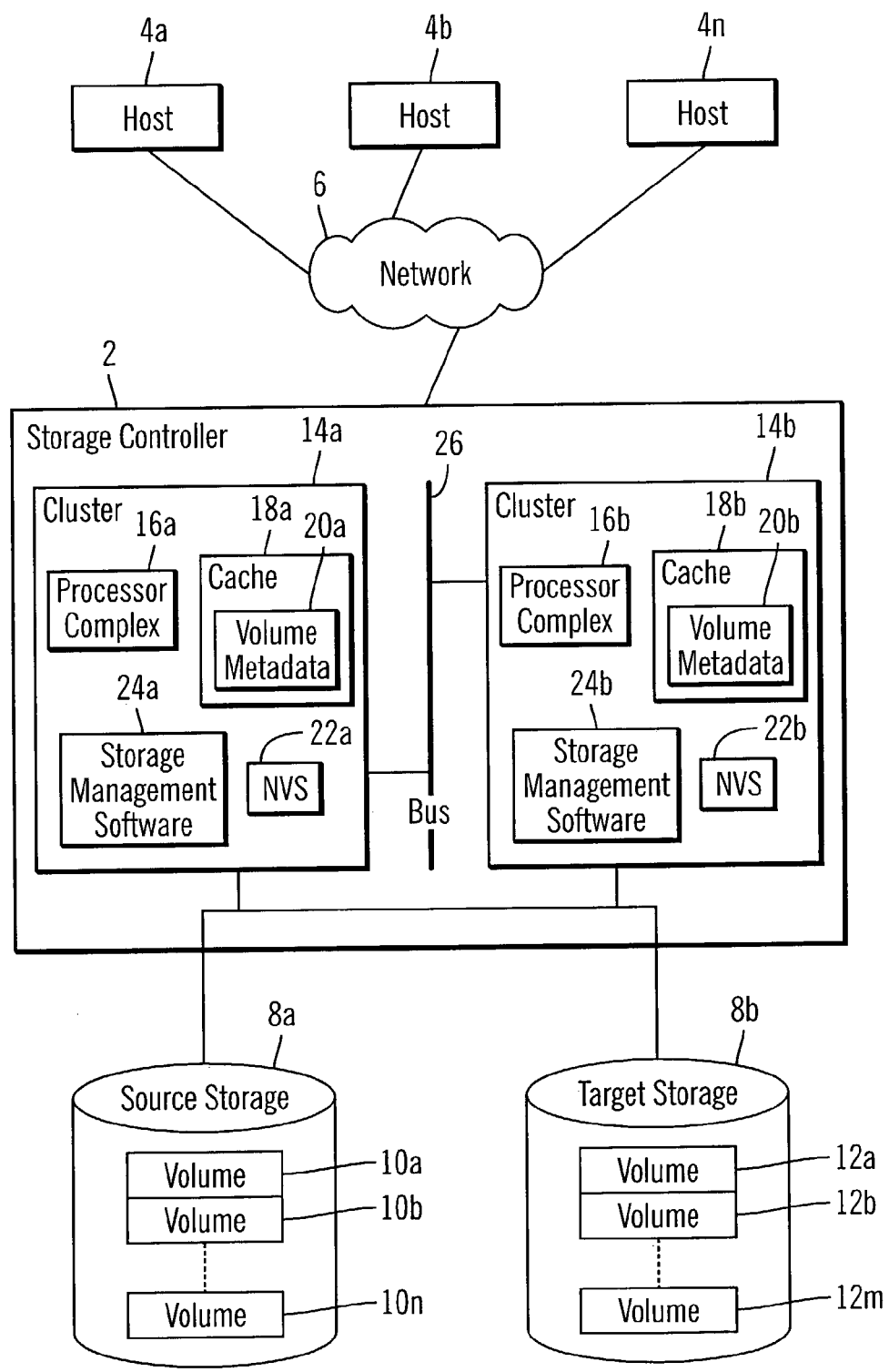
FIG. 1 illustrates a computing environment in which aspects of the invention are implemented.

FIG. 1 illustrates a computing architecture in which aspects of the invention are implemented. A storage controller 2 would receive Input/Output (I/O) requests from host systems 4a, 4b . . . 4n over a network 6 directed toward storage devices 8a, 8b configured to have volumes (e.g., Logical Unit Numbers, Logical Devices, etc.) 10a, 10b . . . 10n and 12a, 12b . . . 12m, respectively, where m and n may be different integer values or the same value. The storage controller 2 further includes two clusters 14a, 14b, each including a processor complex 16a, 16b, cache 18a, 18b including volume metadata 20a, 20b, and a non-volatile storage unit 22a, 22b to provide backup storage of updates in the cache 18a, 18b. The clusters 16a, 16b may have different power boundaries. In the described implementation, cluster 14a manages volumes that are source volumes and cluster 14b manages volumes that are target volumes involved in a point-in-time copy relationship. Additionally, each cluster 14a, 14b may manage both target and source volumes in different point-in-time copy relationships. Each cluster 14a, 14b includes storage management software 24a, 24b executed by the processor complexes 16a, 16b to manage the copying of data between the different storage devices 8a, 8b, such as the type of logical copying that occurs during a FlashCopy® operation. A bus 26 provides a communication interface to enable communication between the clusters 14a, 14b. The bus may comprise any communication interface known in the art, such as Peripheral Component Interconnect (PCI) bus, or other bus interfaces, or a network communication interface, such as a Wide Area Network (WAN), Storage Area Network (SAN), Local Area Network (LAN), the Internet, a wireless network, etc.

The storage controller 2 may comprise any storage controller or server known in the art, such as the IBM Enterprise Storage Server (ESS)®, 3990® Storage Controller, etc. (Enterprise Storage Server is a registered trademark of IBM). The clusters 14a, 14b may be in the same storage controller 2 as shown in FIG. 1 or in different storage controllers. The hosts 4a, 4b . . . 4n may comprise any computing device known in the art, such as a server, mainframe, workstation, personal computer, hand held computer, laptop, telephony device, network appliance, etc. The storage controller 2 and host system(s) 4a, 4b . . . 4n communicate via a network 6, which may comprise a Storage Area Network (SAN), Local Area Network (LAN), Intranet, the Internet, Wide Area Network (WAN), etc. The storage systems 8a, 8b may comprise an array of storage devices, such as a Just a Bunch of Disks (JBOD), DASD, Redundant Array of Independent Disks (RAID) array, virtualization device, etc.

Figure 2A:
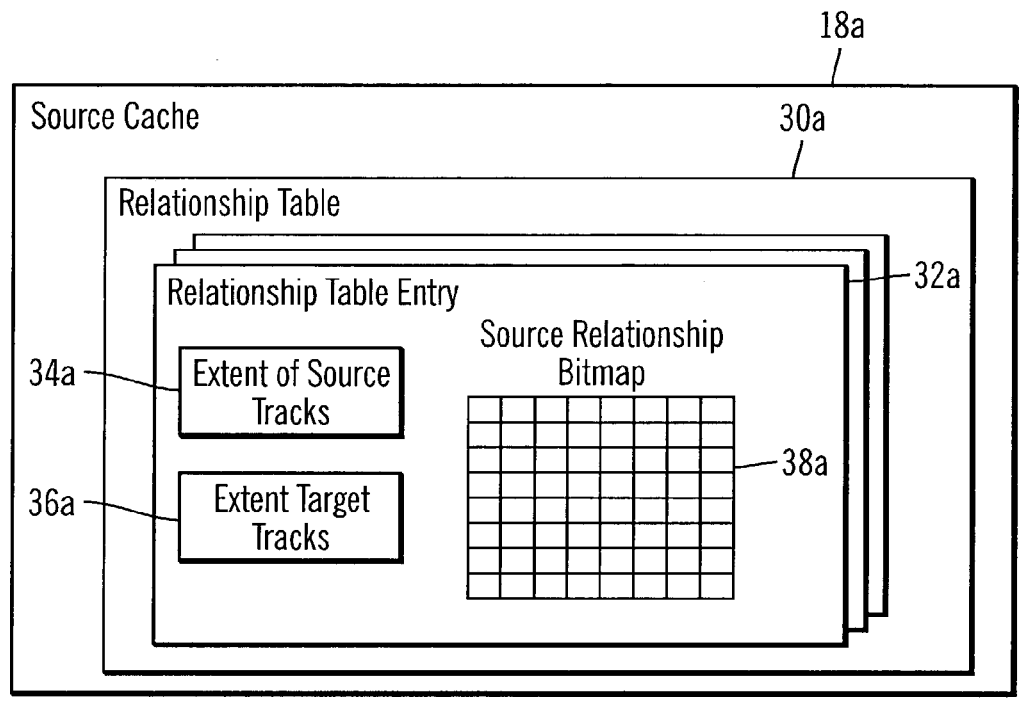
FIGS. 2a and 2b illustrate data structures used to maintain a logical point-in-time copy relationship in accordance with implementations of the invention.
Figure 2B:
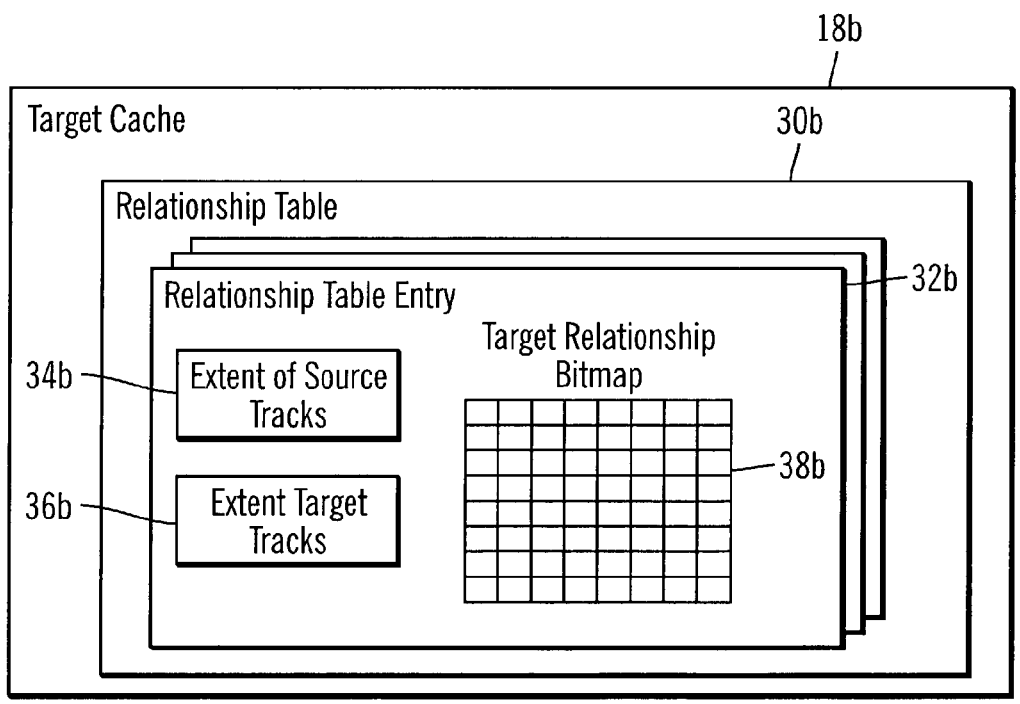

When a host 4a, 4b . . . 4n initiates an operation to establish a point-in-time copy operation for specified tracks in volumes 10a, 10b . . . 10n in the source storage 8a to specified tracks in volumes 12a, 12b . . . 12m in the target storage 8b, the storage management software 24a, 24b generates volume metadata 20a, 20b. FIGS. 2a, 2b illustrates data structures that the storage management software 24a, 24b may maintain in the source 18a and target 18b cache or source 8a and target 8b storages. The volume metadata 20a, 20b maintained for the source and target may include a relationship table 30a, 30b having a plurality of relationship table entries 32a, 32b, only one is shown in detail, for each established relationship between a source and target volumes. In the described implementations, the relationship table entries 32a, 32b establish a relationship where cluster 14a manages the source volumes and cluster 14b manages the target volumes in the relationship. Each relationship table entry 32a, 32b includes an extent of source tracks 34a, 34b providing information on those source tracks in the source storage 8a involved in the point-in-time relationship and the corresponding extent of target tracks 36a, 36b in the target storage 8b involved in the relationship, wherein an ith track in the extent of source tracks 34a, 34b corresponds to the ith track in the extent of target tracks 36a, 36b.

Each relationship table entry 32a, 32b further includes a relationship bit map 38a, 38b. Each bit in the relationship bitmap 38a, 38b indicates whether the corresponding track managed by the cluster 14a, 14b is in the storage managed by that cluster 14a, 14b, or in another storage. For instance, if a bit in the target relationship bitmap 38b is "on" (or "off"), then the data for the track corresponding to such bit is located in the source storage 8a. In the described implementations, the source relationship bitmap 38a maintains a copy of the target relationship bitmap 38b that the cluster 14a uses to determine whether the point-in-time copy of the tracks have been destaged to the target storage 8b. In further implementations, the information described as implemented in the relationship bitmaps 38a, 38b may be implemented in any data structure known in the art, such as a hash table, etc.

The relationship table entries 32a, 32b may indicate additional information, such as the device address of the source 8a and target 8b storage devices, number of tracks copied over from the source extent 34 to the target extent 36, etc. As discussed, after the point-in-time copy is established, the physical data my be copied over from the source to target as part of a background operation. Additional information that may be maintained in a relationship table used to establish a point-in-time copy is further described in the commonly assigned patent entitled "Method, System, and Program for Maintaining Electronic Data at of a Point-in-time", having U.S. Pat. No. 6,611,901, which patent is incorporated herein by reference in its entirety.

Figure 3:
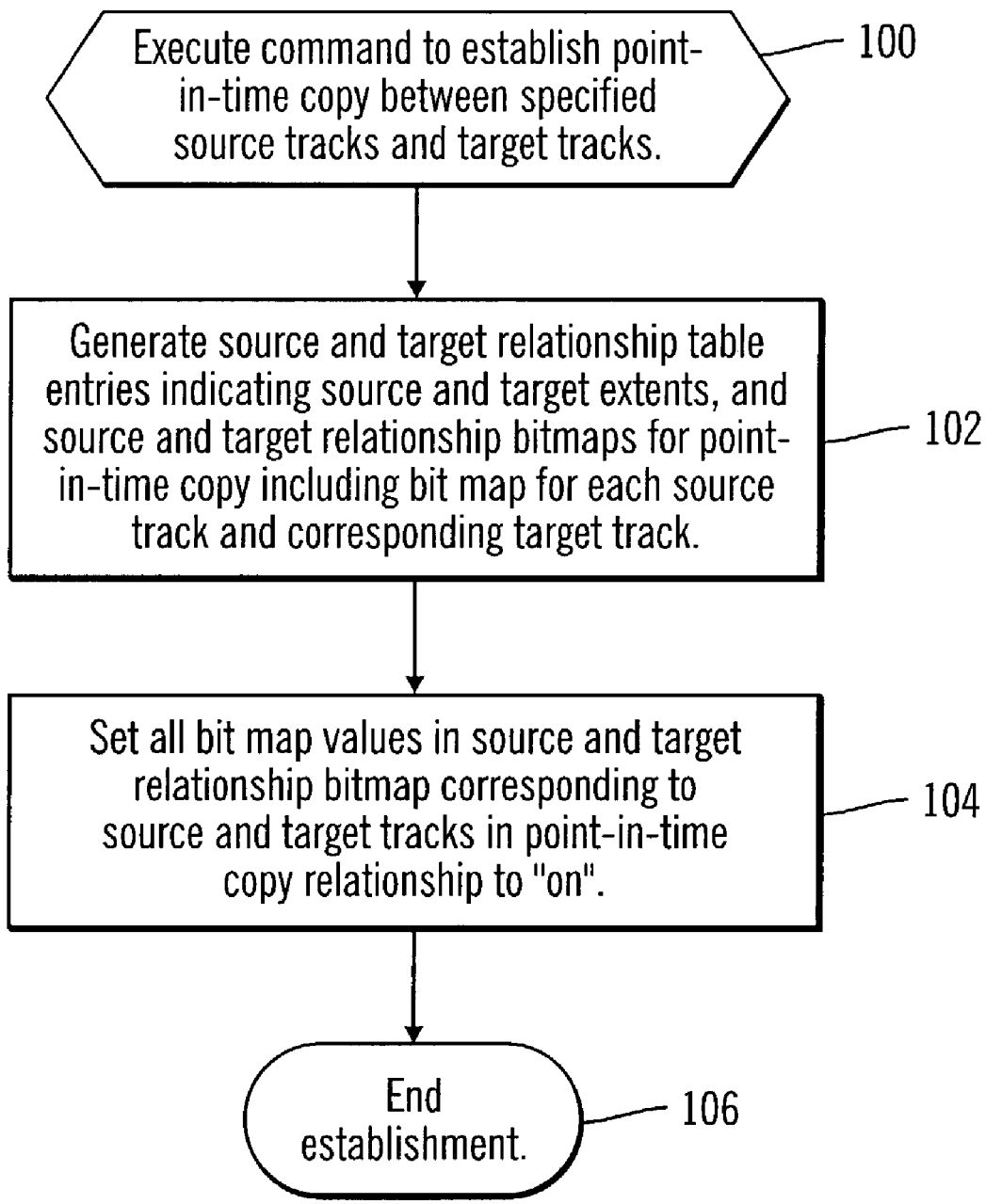
FIGS. 3, 4, 5, 6, and 7 illustrate logic to establish and use a logical point-in-time copy relationship in accordance with implementations of the invention.

FIG. 3 illustrates logic implemented in the storage management software 24a, 24b to perform operations related to establishing a point-in-time copy relationship between tracks in the source storage 8a and tracks in the target storage 8b, such as may occur as part of a FlashCopy® operation or any other type of logical copy operation. The storage management software 24a, 24b would separately execute in each processor complex 16a, 16b to establish the necessary data structures for the source and target, respectively. Upon receiving (at block 100) a command from a host 4a, 4b . . . 4n to establish a point-in-time copy relationship between specified source tracks and specified target tracks, the storage management software 24a, 24b generates (at block 102) a source and target relationship table entries 32a, 32b indicating an extent of source tracks 34a, 34b and target tracks 36a, 36b subject to the logical copy relationship and source and target relationship bitmaps 38a, 38b including a bit for each target-source track pair in the point-in-time copy relationship to indicate whether the data from the source track has been copied to the corresponding target track. All the bits in the relationship bitmap 38a, 38b may be initialized (at block 104) to "on". A background copy operation may copy the source tracks to the target tracks after the logical point-in-time copy is established. When a source track is copied to a target track as part of such a background copy operation or any other operation, then the bit corresponding to the source track just copied to the target track is eventually set to "off" in both the source 38a and target 38b relationship bitmaps in order to indicate that there is no further need to copy the source track as of the point-in-time to the corresponding target track at the target storage 8b.

With the described logic, the establishment process ends after generating the copy relationship information as a relationship table entry 32a, 32b and both the source 38a and target 38b relationship bitmap values representing tracks involved in the point-in-time copy relationship are initialized to "on". This reduces the establishment process by a substantial amount of time, such as several seconds, thereby reducing the time during which the source and target volumes are offline to host I/O access during the establishment of the point-in-time copy relationship. Additional operations may further be performed as part of the establishment process.

In described implementations, the cluster 14a manages I/O access to volumes 10a, 10b . . . 10n that are designated as source tracks in a point-in-time copy relationship and cluster 14b manages I/O access to volumes 12a, 12b . . . 12n that are designated as target tracks in a point-in-time copy relationship. In the event that one cluster, e.g., cluster 14a, failed, then during a failover, the surviving cluster, e.g., cluster 14b would manage access to the volumes managed by the failed cluster 14a. Thus, both clusters 14a, 14b have access to all the storage volumes 8a, 8b.

Figure 4:
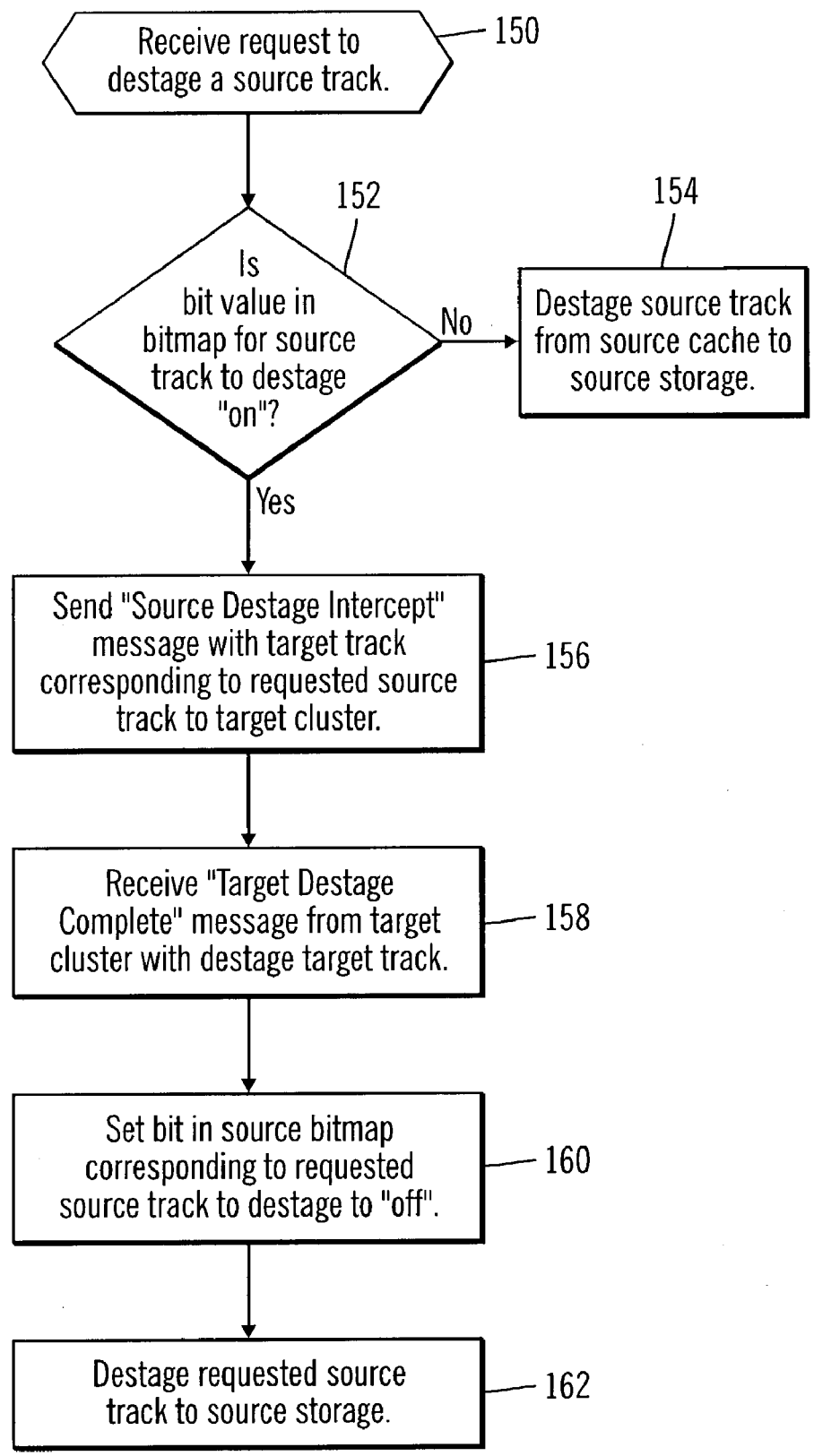

FIG. 4 illustrates logic implemented in the storage management software 24a, 24b to process a request to destage a source track in a point-in-time copy relationship, as indicated in the extent of source tracks 34a. Upon receiving (at block 150) the request to destage a source track from source cache 18, if (at block 152) the bit value in the source relationship bitmap 38a corresponding to the requested source track to destage is not "on", indicating that there is no need to copy the source point-in-time copy of the target track, then the source track in the source cache 18a is destaged (at block 154) to the source storage 8a. Otherwise, if (at block 152) the bit value is "on", indicating that the point-in-time copy of the source track needs to be copied to the target storage 8b, then the storage management software 24a in the source cluster 14a sends (at block 156) a "Source Destage Intercept" message identifying the target track corresponding to the requested source track to destage to the target cluster 14b.

Figure 5:
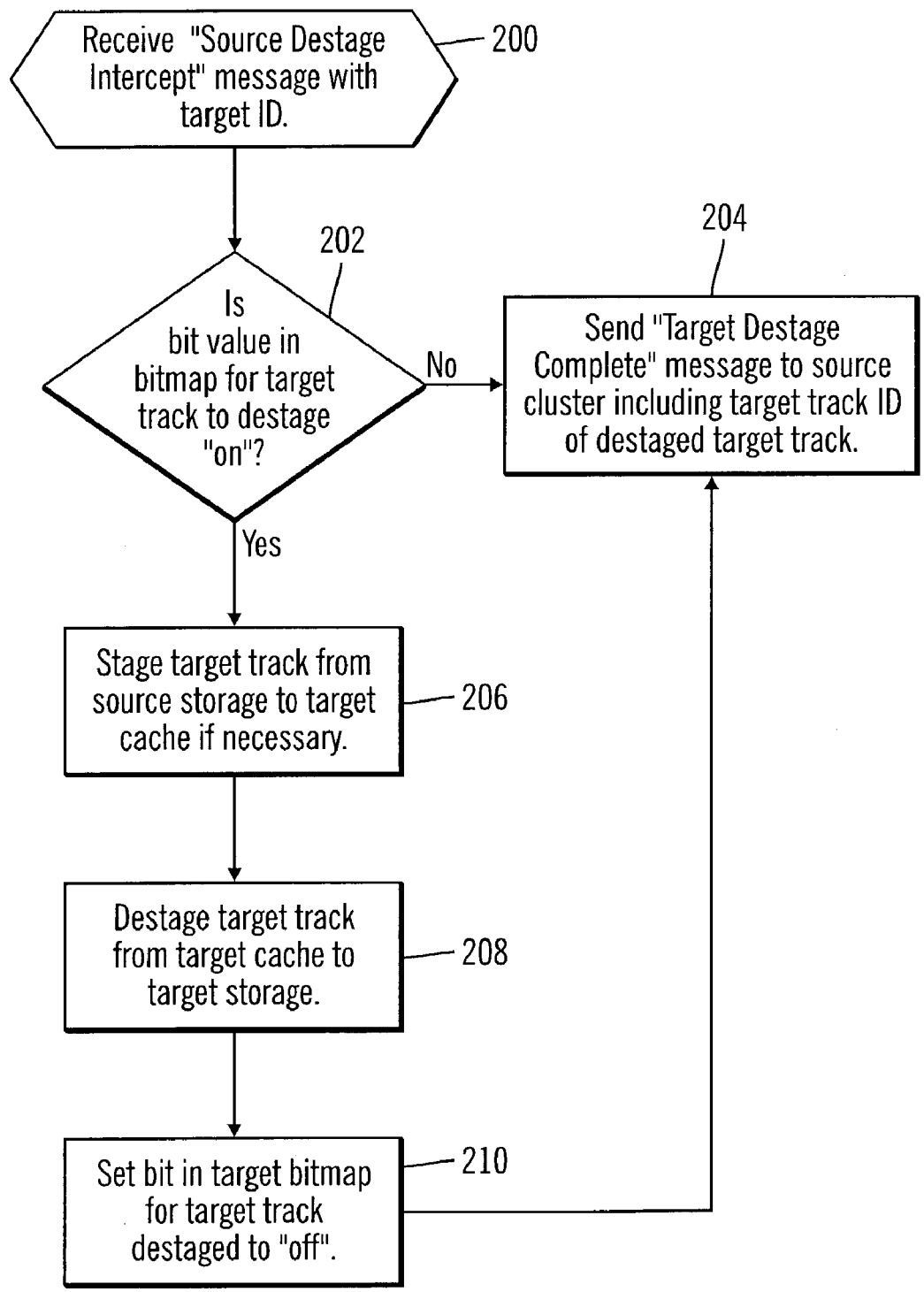

FIG. 5 illustrates logic implemented in the storage management software 24a, 24b to process a "Source Destage Intercept" message. In response (at block 200) to such message, if (at block 202) the bit value in the target relationship bitmap 38b corresponding to the target track indicated in the message is not "on", then the point-in-time source track is no longer needed, and a "Target Destage Complete" message is sent (at block 204) to the source cluster 14a including target track ID of the target track checked. Otherwise, if the bit value in the target relationship bitmap 38b is "on", then the storage management software 24b in the target cluster 14b stages (at block 206) the target track indicated in the "Target Destage Complete" message from the source storage 8a to the target cache 18b. In certain situations, the source bit value may be "on", but the track from the source storage may have already been copied over to the target cache 18b because the copying over has not yet been acknowledged and reflected in the source relationship bitmap 38a. The target track is then destaged (at block 208) from the target cache 18b to the target storage 8b. After destaging the target track, the bit in target bitmap 38b (FIG. 2b) corresponding to the destaged target track is set to "off". After setting the bit value to "off", control proceeds to block 204 to send the "Target Destage Complete" message to the source cluster 14a identifying the target track destage.

With respect to FIG. 4, upon receiving (at block 158) the "Target Destage Complete" message from the target cluster 14b indicating the destaged target track in response to the previously transmitted "Source Destage Intercept", the storage management software 24a executing in the source cluster 14a sets (at block 160) the bit in the source bitmap 38a corresponding to the source track to destage to "off". The source track is then destaged (at block 162) to source storage 8a.

Figure 6:
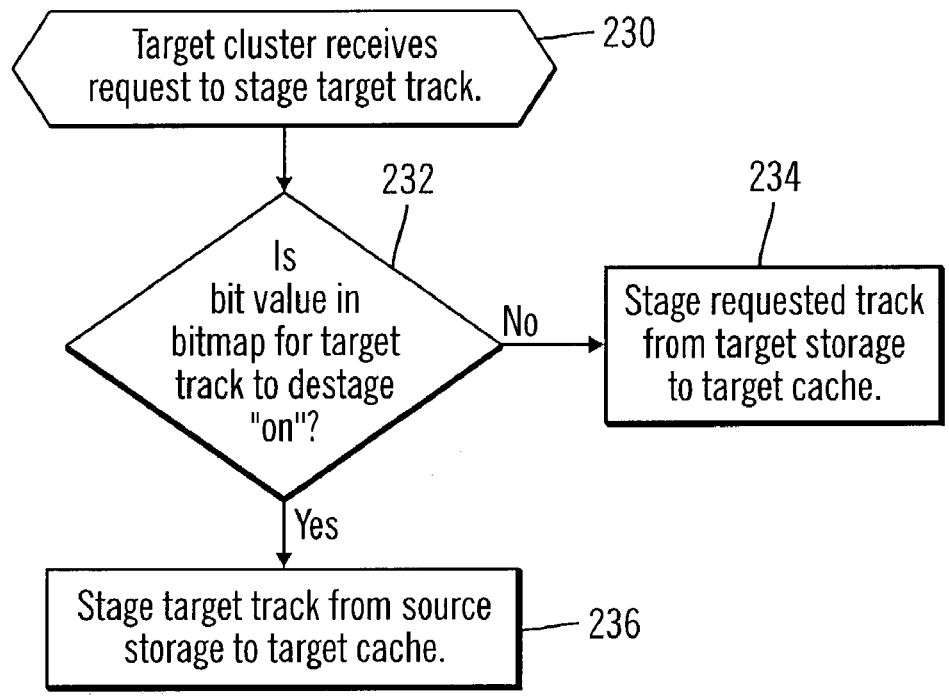

FIG. 6 illustrates logic implemented in the storage management software 24a, 24b to process a request to stage a target track in a point-in-time copy relationship to the target cache 18b. Upon receiving (at block 230) the stage request, if (at block 232) the bit value in the target relationship bitmap 38b is not "on", indicating that the point-in-time copy has already been destaged, then the storage management software 24b in the target cluster 14b stages (at block 234) the requested target track from the target storage 8b to the target cache 18b. Otherwise, if (at block 232) the bit value in the target relationship bitmap 38b is "on", then the storage management software 24b in the target cluster 14b stages (at block 236) the target track from the source storage 8a to the target cache 18b to ensure that the point-in-time copy will be written to the target storage 8b.

Figure 7:
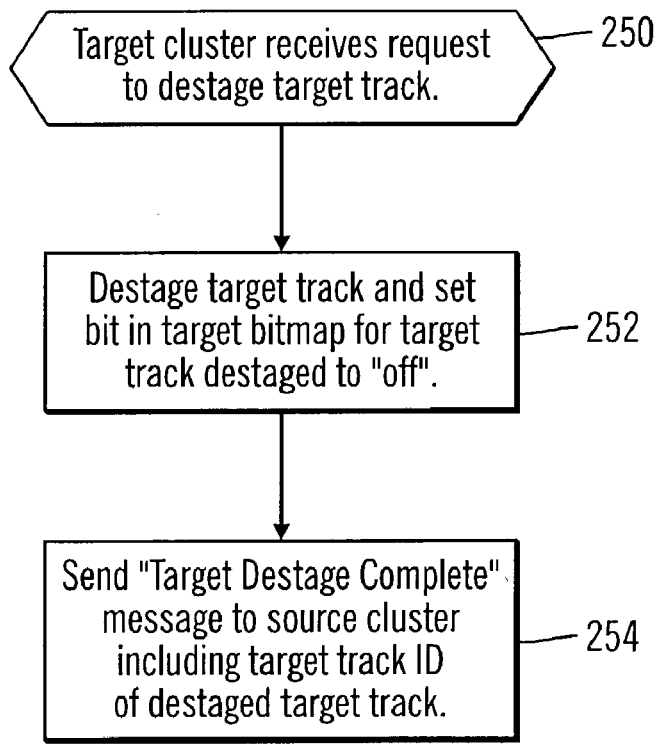

FIG. 7 illustrates logic implemented in the storage management software 24a, 24b to process a request to destage a target track in a point-in-time copy relationship to the target cache 18b. Upon receiving (at block 250) the request, the storage management software 24b in the target cluster 14b sets (at block 252) the bit value in the target bitmap 38 corresponding to the target track being destaged to "off" and then sends (at block 254) a "Target Destage Complete" message to the source cluster 14a including the target track ID of the destaged target track.

With the described implementations, the source cluster 14a maintains, through the source relationship bitmap 38a, a copy of the target relationship bitmap 38b that is updated whenever the target cluster 14b destages a target track to target storage 8b. The above described logic ensures that the source cluster 14a will not destage an updated track in the source cache 18a in a manner that would overwrite a source track in source storage 8a that is subject to a point-in-time copy relationship and has not yet been copied over to the corresponding target track in target storage 8b. With the above described logic, even if a message was lost, the source cluster 14a would still not overwrite any point-in-time source tracks not yet copied to the target because the storage management software requires acknowledgment of a target destage complete message for a track before setting the corresponding bit in the source bitmap 38a to "off". This acknowledgment ensures that the source confirms that the point-in-time copy source track has been copied to the target or overwritten such that the source track is no longer needed. Further, although a bit value of "off" indicates that the source track has already been copied over, if the bit value is "on", the source track may have been copied over without confirmation from the target of the copy.

In further implementations of FIG. 7, if the storage management software 24b attempts to destage a target track in target cache 16b that is partially written, then the storage management software 24b may stage in from the source storage 8a that portion of the target track not included in the target cache 18b, so that when the target track is subsequently destaged, the destaged data includes the partial update and the point-in-time version of the source data for that portion of the target track in the target cache 16b that has not been updated.

In additional implementations, if an entire target track (all sectors) in the target cache 18b has been modified, then the storage management software 24b at the target cluster 14b can turn the corresponding bit value in the target relationship bitmap to 38b "off" and send a "Target Destage Complete" message to the source cluster 14a to update the source relationship bitmap 38a. This operation would improve performance by allowing the source cluster 14a to destage a track without having to send a "Source Destage Intercept" message and wait for a response from the target cluster 14b.

In yet further implementations, if the source relationship bitmap 38a becomes corrupted, then the storage management software 24a may set all values in the source relationship bitmap 38a and then require that the source cluster 14a confirm that the target track has been destaged before destaging a source track.

Additional Implementation Details

The described techniques for establishing and using a point-in-time copy relationship may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations for establishing a logical point-in-time copy relationship were described for use with systems deployed in a critical data environment where high availability is paramount. However, those skilled in the art will appreciate that the point-in-time copy operations described herein may apply to storage systems used for non-critical data where high availability is not absolutely necessary.

In the described implementations, the source and target storage were managed by different clusters 14a, 14b. In alternative implementations, the source and target volumes subject to a point-in-time copy relationship may be in different Logical Subsystems (LSS) on the same or different clusters, or in different machines, control units, etc. If the source and target are on the same cluster, then instead of sending messages, the source and target may issue function calls to perform the same processing and operations that are effected by the "Source Destage Intercept" and "Target Destage Complete" messages. This insures that in any context where the source and target do not share the same addressing resources, i.e., can read data on the other, messages or functions are used to coordinate destaging and staging operations to prevent deadlock or corruption in the point-in-time copy relationship.

The illustrated logic of FIGS. 3–7 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 8:
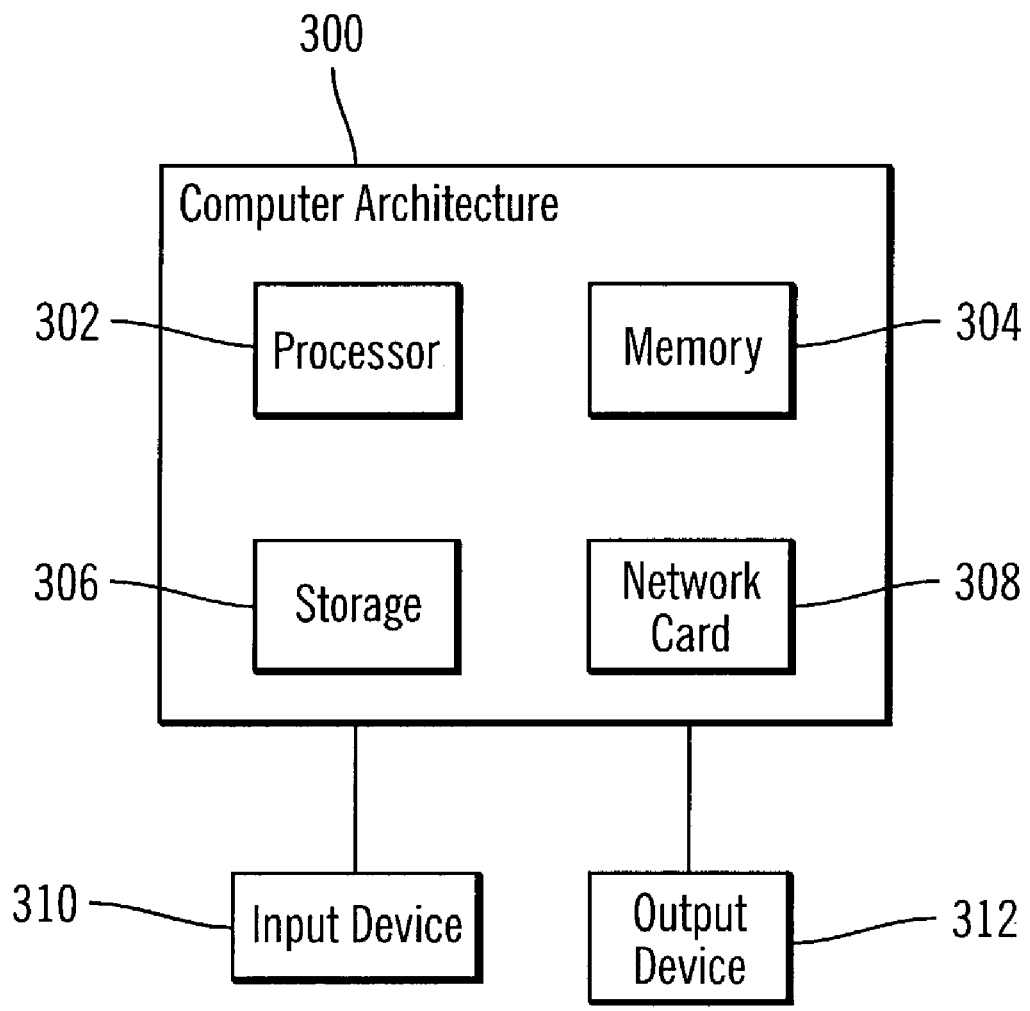
FIG. 8 illustrates an architecture of computing components in the network environment, such as the hosts and storage controller, and any other computing devices.

FIG. 8 illustrates one implementation of a computer architecture 300 of the network components, such as the hosts and storage controller shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for establishing a point-in-time copy, comprising:
generating a source relationship data structure and target relationship data structure when establishing a point-in-time copy relationship between source and target storage areas, wherein the source and target relationship data structures each include an indicator for each source storage area and corresponding target storage area in the point-in-time copy relationship;
initializing the source and target relationship data structures to set the indicator for each source storage area and corresponding target storage area in the point-in-time copy relationship to a first value;
determining that data was written to one target storage area after establishing the point-in-time copy relationship;
setting the indicators to a second value in the source and target relationship data structures corresponding to the source storage area and corresponding target storage area in response to determining that the data was written to the corresponding target;
receiving a request to update one source storage area included in the point-in-time copy relationship;
if the indicator in the source relationship data structure for the source storage area to update is the first value, then determining whether the indicator in the target relationship data structure for the target storage area corresponding to the source storage area to update is set to the first value;
if the determined indicator in the target relationship data structure is the first value, then writing the data in the source storage area to update to the target storage area; and
applying the update to the source storage area after writing the data in the source storage area to the target storage area if the determined indicator in the target relationship data structure is the first value.

2. The method of claim 1, wherein the target and source relationship data structures comprise bitmaps, wherein the bitmap includes a bit value for each source and target storage area included in the point-in-time copy relationship.

3. The method of claim 1, further comprising:
if the indicator in the source relationship data structure for the source storage area to update is the second value, then applying the update to the source storage area.

4. The method of claim 1, further comprising:
applying the update to the source storage area in response to determining that the determined indicator in the target relationship data structure is the second value.

5. The method of claim 1, further comprising:
generating an update intercept message indicating the source storage area to update if the indicator in the source relationship data structure for the source storage area to update is the first value, wherein the determination of whether the indicator in the target relationship data structure for the target storage area corresponding to the source storage area to update is set to the first value is performed in response to the update intercept message.

6. The method of claim 5, further comprising:
generating a write complete message after writing the data in the source storage area to the target storage area, wherein the update is applied to the source storage area in response to receiving the write complete message.

7. The method of claim 6, wherein the source and target storage areas are in a first and second clusters, respectively, and wherein generating the update intercept message further comprises transmitting, by the first cluster, the update intercept message to the second cluster; and wherein generating the write complete message further comprises transmitting, by the second cluster, the write complete message to the first cluster.

8. The method of claim 6, wherein the source and target storage areas are in first and second logical subsystems, respectively, and wherein generating the update intercept message further comprises making a function call to communicate the write intercept message, and wherein generating the write complete message further comprises making a function call to communicate the write complete message.

9. The method of claim 1, wherein the indicator in the target relationship data structure for the target storage area to which data was written in response to the update intercept message is set to the second value after writing the source storage area to the target storage area and wherein the indicator in the source relationship data structure is set to the second value after applying the update to the target storage area.

10. The method of claim 1, wherein the storage areas comprise tracks, wherein the request to update the source storage area comprises a request to destage data from the source tracks in a source cache to the source tracks, and wherein writing the data in the source storage area to the target storage area comprises staging the data in the source tracks to a target cache and then destaging the tracks written from the source tracks in the target cache to the target storage area.

11. A method for establishing a point-in-time copy, comprising:
generating a source relationship data structure and target relationship data structure when establishing a point-in-time copy relationship between source and target storage areas, wherein the source and target relationship data structures each include an indicator for each source storage area and corresponding target storage area in the point-in-time copy relationship;
initializing the source and target relationship data structures to set the indicator for each source storage area and corresponding target storage area in the point-in-time copy relationship to a first value;
determining that data was written to one target storage area after establishing the point-in-time copy relationship;
setting the indicators to a second value in the source and target relationship data structures corresponding to the source storage area and corresponding target storage area in response to determining that the data was written to the corresponding target area;
receiving a request for data in the target storage area;
if the indicator in the target relationship data structure for the requested target storage area is set to the first value, then returning the source storage area corresponding to the requested target storage area; and
if the indicator in the target relationship data structure for the requested target storage area is set to the second value, then returning the requested target storage area from the target storage area.

12. The method of claim 11, wherein the storage areas comprise tracks, wherein the request is to stage data from the target tracks to a target cache, wherein returning the requested target storage area from the corresponding source storage area comprises staging the source tracks corresponding to the target tracks to the target cache, and wherein returning the requested target storage area comprises staging the requested target tracks to the target cache.

13. A method for establishing a point-in-time copy, comprising:
generating a source relationship data structure and target relationship data structure when establishing a point-in-time copy relationship between source and target storage areas, wherein the source and target relationship data structures each include an indicator for each source storage area and corresponding target storage area in the point-in-time copy relationship, and wherein the storage areas comprise tracks;
initializing the source and target relationship data structures to set the indicator for each source storage area and corresponding target storage area in the point-in-time copy relationship to a first value;
determining whether a target track in a target cache was destaged to the target track after establishing the point-in-time copy relationship; and
setting the indicators to a second value in the source and target relationship data structures corresponding to the source storage area and corresponding target storage area in response to determining that the target track was destaged from the target cache.

14. The method of claim 13, further comprising:
generating a message indicating that the target track was destaged after destaging the target track from the target cache, wherein the indicator in the target relationship data structure is set to the second value after the target track is destaged, and wherein the indicator in the source relationship data structure is set to the second value in response to the message.

15. A system for establishing a point-in-time copy, comprising:
means for generating a source relationship data structure and target relationship data structure when establishing a point-in-time copy relationship between source and target storage areas, wherein the source and target relationship data structures each include an indicator for each source storage area and corresponding target storage area in the point-in-time copy relationship;
means for initializing the source and target relationship data structures to set the indicator for each source storage area and corresponding target storage area in the point-in-time copy relationship to a first value;
means for determining that data was written to one target storage area after establishing the point-in-time copy relationship;
means for setting the indicators to a second value in the source and target relationship data structures corresponding to the source storage area and corresponding target storage area in response to determining that the data was written to the corresponding target area;
means for receiving a request to update one source storage area included in the point-in-time copy relationship;
means for determining whether the indicator in the target relationship data structure for the target storage area corresponding to the source storage area to update is set to the first value if the indicator in the source relationship data structure for the source storage area to update is the first value;
means for writing the data in the source storage area to update to the target storage area if the determined indicator in the target relationship data structure is the first value; and
means for applying the update to the source storage area after writing the data in the source storage area to the target storage area if the determined indicator in the target relationship data structure is the first value.

16. The system of claim 15, further comprising:
means for applying the update to the source storage area if the indicator in the source relationship data structure for the source storage area to update is the second value.

17. The system of claim 15, further comprising:
means for generating an update intercept message indicating the source storage area to update if the indicator in the source relationship data structure for the source storage area to update is the first value, wherein the determination of whether the indicator in the target relationship data structure for the target storage area corresponding to the source storage area to update is set to the first value is performed in response to the update intercept message.

18. A system for establishing a point-in-time copy, comprising:
means for generating a source relationship data structure and target relationship data structure when establishing a point-in-time copy relationship between source and target storage areas, wherein the source and target relationship data structures each include an indicator for each source storage area and corresponding target storage area in the point-in-time copy relationship;
means for initializing the source and target relationship data structures to set the indicator for each source storage area and corresponding target storage area in the point-in-time copy relationship to a first value;
means for determining that data was written to one target storage area after establishing the point-in-time copy relationship;
means for setting the indicators to a second value in the source and target relationship data structures corresponding to the source storage area and corresponding target storage area in response to determining that the data was written to the corresponding target area;
means for receiving a request for data in the target storage area;
means for returning the source storage area corresponding to the requested target storage area if the indicator in the target relationship data structure for the requested target storage area is set to the first value; and
means for returning the requested target storage area from the target storage area if the indicator in the target relationship data structure for the requested target storage area is set to the second value.

19. A system for establishing a point-in-time copy, comprising:
means for generating a source relationship data structure and target relationship data structure when establishing a point-in-time copy relationship between source and target storage areas, wherein the source and target relationship data structures each include an indicator for each source storage area and corresponding target storage area in the point-in-time copy relationship, and wherein the storage areas comprise tracks;
means for initializing the source and target relationship data structures to set the indicator for each source storage area and corresponding target storage area in the point-in-time copy relationship to a first value;

means for determining whether a target track in a target cache was destaged to the target track after establishing the point-in-time copy relationship; and means for setting the indicators to a second value in the source and target relationship data structures corresponding to the source storage area and corresponding target storage area in response to determining that the target track was destaged from the target cache.

20. An article of manufacture for establishing a point-in-time copy, wherein the article of manufacture causes operations to be performed, the operations comprising:

generating a source relationship data structure and target relationship data structure when establishing a point-in-time copy relationship between source and target storage areas, wherein the source and target relationship data structures each include an indicator for each source storage area and corresponding target storage area in the point-in-time copy relationship;

initializing the source and target relationship data structures to set the indicator for each source storage area and corresponding target storage area in the point-in-time copy relationship to a first value;

determining that data was written to one target storage area after establishing the point-in-time copy relationship;

setting the indicators to a second value in the source and target relationship data structures corresponding to the source storage area and corresponding target storage area in response to determining that the data was written to the corresponding target area;

receiving a request to update one source storage area included in the point-in-time copy relationship;

if the indicator in the source relationship data structure for the source storage area to update is the first value, then determining whether the indicator in the target relationship data structure for the target storage area corresponding to the source storage area to update is set to the first value;

if the determined indicator in the target relationship data structure is the first value, then writing the data in the source storage area to update to the target storage area; and applying the update to the source storage area after writing the data in the source storage area to the target storage area if the determined indicator in the target relationship data structure is the first value.

21. The article of manufacture of claim 20, wherein the target and source relationship data structures comprise bitmaps, wherein the bitmap includes a bit value for each source and target storage area included in the point-in-time copy relationship.

22. The article of manufacture of claim 20, further comprising:

if the indicator in the source relationship data structure for the source storage area to update is the second value, then applying the update to the source storage area.

23. The article of manufacture of claim 20, further comprising:

applying the update to the source storage area in response to determining that the determined indicator in the target relationship data structure is the second value.

24. The article of manufacture of claim 20, further comprising:

generating an update intercept message indicating the source storage area to update if the indicator in the source relationship data structure for the source storage area to update is the first value, wherein the determination of whether the indicator in the target relationship data structure for the target storage area corresponding to the source storage area to update is set to the first value is performed in response to the update intercept message.

25. The article of manufacture of claim 24, further comprising:

generating a write complete message after writing the data in the source storage area to the target storage area, wherein the update is applied to the source storage area in response to receiving the write complete message.

26. The article of manufacture of claim 25, wherein the source and target storage areas are in a first and second clusters, respectively, and wherein generating the update intercept message further comprises transmitting, by the first cluster, the update intercept message to the second cluster; and wherein generating the write complete message further comprises transmitting, by the second cluster, the write complete message to the first cluster.

27. The article of manufacture of claim 25, wherein the source and target storage areas are in first and second logical subsystems, respectively, and wherein generating the update intercept message further comprises making a function call to communicate the write intercept message, and wherein generating the write complete message further comprises making a function call to communicate the write complete message.

28. The article of manufacture of claim 20, wherein the indicator in the target relationship data structure for the target storage area to which data was written in response to the update intercept message is set to the second value after writing the source storage area to the target storage area and wherein the indicator in the source relationship data structure is set to the second value after applying the update to the target storage area.

29. The article of manufacture of claim 20, wherein the storage areas comprise tracks, wherein the request to update the source storage area comprises a request to destage data from the source tracks in a source cache to the source tracks, and wherein writing the data in the source storage area to the target storage area comprises staging the data in the source tracks to a target cache and then destaging the tracks written from the source tracks in the target cache to the target storage area.

30. An article of manufacture for establishing a point-in-time copy, wherein the article of manufacture causes operations to be performed, the operations comprising:

generating a source relationship data structure and target relationship data structure when establishing a point-in-time copy relationship between source and target storage areas, wherein the source and target relationship data structures each include an indicator for each source storage area and corresponding target storage area in the point-in-time copy relationship;

initializing the source and target relationship data structures to set the indicator for each source storage area and corresponding target storage area in the point-in-time copy relationship to a first value;

determining that data was written to one target storage area after establishing the point-in-time copy relationship;

setting the indicators to a second value in the source and target relationship data structures corresponding to the source storage area and corresponding target storage area in response to determining that the data was written to the corresponding target area;

receiving a request for data in the target storage area;

if the indicator in the target relationship data structure for the requested target storage area is set to the first value, then returning the source storage area corresponding to the requested target storage area; and if the indicator in the target relationship data structure for the requested target storage area is set to the second value, then returning the requested target storage area from the target storage area.

31. The article of manufacture of claim 30, wherein the storage areas comprise tracks, wherein the request is to stage data from the target tracks to a target cache, wherein returning the requested target storage area from the corresponding source storage area comprises staging the source tracks corresponding to the target tracks to the target cache, and wherein returning the requested target storage area comprises staging the requested target tracks to the target cache.

32. An article manufacture for establishing a point-in-time copy, wherein the article of manufacture causes operations to be performed, the operations comprising:

generating a source relationship data structure and target relationship data structure when establishing a point-in-time copy relationship between source and target storage areas, wherein the source and target relationship data structures each include an indicator for each source storage area and corresponding target storage area in the point-in-time copy relationship, wherein the storage areas comprise tracks;

initializing the source and target relationship data structures to set the indicator for each source storage area and corresponding target storage area in the point-in-time copy relationship to a first value;

determining whether a target track in a target cache was destaged to the target track after establishing the point-in-time copy relationship; and setting the indicators to a second value in the source and target relationship data structures corresponding to the source storage area and corresponding target storage area in response to determining that the target track was destaged from the target cache.

33. The article of manufacture of claim 32, further comprising:

generating a message indicating that the target track was destaged after destaging the target track from the target cache, wherein the indicator in the target relationship data structure is set to the second value after the target track is destaged, and wherein the indicator in the source relationship data structure is set to the second value in response to the message.

* * * * *